Figure 1:
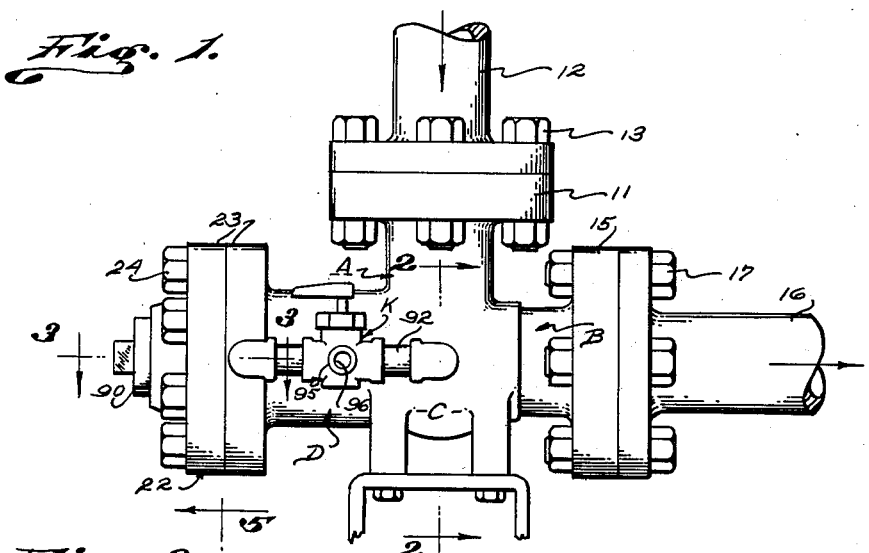

Jan. 13, 1953  J. S. PAGE  2,625,172
FLOW CONTROLLING DEVICE
Filed April 24, 1950  2 SHEETS—SHEET 1

INVENTOR.
John S. Page
BY
Attorney

Patented Jan. 13, 1953

2,625,172

UNITED STATES PATENT OFFICE 2,625,172

FLOW CONTROLLING DEVICE

John S. Page, Long Beach, Calif.

Application April 24, 1950, Serial No. 157,678

19 Claims. (Cl. 137—315)

This invention has to do with a flow controlling device and it is a general object of the invention to provide a device suitable for handling fluids at high pressures and embodying a choke or flow bean and a positive shut-off mechanism, which elements are so related that when the shut off is in operation stopping flow the flow bean or choke can be removed or replaced as circumstances may require.

There are various situations where chokes or flow beans are employed to cut down or regulate flow, such devices being common in the control of oil wells. In many situations the fluids or materials being handled and the pressures involved are such that the flow choking parts wear or cut out rapidly, requiring repair or replacement, while in other situations it is desirable to vary the size of the chokes from time to time, as conditions vary. With equipment ordinarily employed in situations of the character mentioned numerous valves and more or less complicated and expensive connections are required to facilitate repair or replacement of chokes.

A general object of this invention is to provide a flow controlling device which combines in a single unit or structure an effective choke and a positive shut-off mechanism, the choke and mechanism being so related that when the flow is completely stopped or shut off by the mechanism the choke can be reached for purpose of removal, thus making repair or replacement of the choke a simple, easily performed operation.

It is a further object of the invention to provide a structure of the general character referred to in which the choke or flow bean is such as to effectively handle flow through the device and is at the same time subject to being handled, that is, placed in or removed from the structure, by means of a very simple implement, say, for instance, an ordinary bolt, or the like.

It is a further object of the invention to provide a flow controlling device of the general character referred to in which the shut-off mechanism is under control of operating means actuated by the pressure on the fluid being handled by the structure.

It is another object of this invention to provide a flow controlling device of the general character referred to in which there are few simple inexpensive parts, making the structure simple and inexpensive of manufacture and dependable in operation.

The device of the present invention involves a body with a flow passage therethrough, and in the preferred arrangement the body is made up of a tubular inlet section and a tubular outlet section, which sections are joined by a corner portion so that the sections are at right angles to each other and thus define an L-shaped flow passage. A cylindrical lateral extension is provided on the body opposite the outlet section and concentric therewith and is closed at its outer end by means of a cap. A choke or flow bean is provided to control flow through the device and is mounted in a carrier insertable into and removable from the body through the lateral extension thereof, and normally supported in the body by means of an insert provided in the outlet section of the body. The insert is slidably carried in a counterbore provided in the outlet section of the body and communicating with the corner portion of the body and it has an end facing or open to the chamber formed by the corner portion of the body and forming a seat. The carrier for the choke has a base portion slidably engaged in a bore in the insert and is supported on a shoulder in the insert. A cage projects from the base portion and carries a head engageable by means of a tool or a device such as a bolt or the like. The choke may be a simple disc with a central opening of suitable size and is slidably supported in the base of the carrier.

A flow control is provided in the structure and involves a tubular element slidably supported in the body extension where it joins the corner portion of the body, the flow control being subject to reciprocation between a position where it is retracted from the chamber formed by the corner portion and an operating position where it extends through or across the chamber and engages the seat established by or formed on the insert. The flow control is tubular in form and fits over or surrounds the cage and head of the carrier. Operating means for the flow control preferably provides for operation of the flow control to the closed position by means of fluid pressure derived from the body. In the preferred form of the invention the flow control has a cylindrical extension fitting freely in the outer portion of the body extension and a head is provided on the cylindrical portion of the flow control and slidably operates in the body extension. A spring, preferably a helical compression spring, is carried in the recess formed between the cylindrical extension of the flow control and the body extension and operates against the head to normally yieldingly hold the flow control out or in a retracted position. A tubular core is carried by the cap that closes the body extension and slidably fits into the cylindrical extension of the flow control. The core is carried in an opening provided through the cap and a plug removable from the exterior of the cap normally closes such opening. A flow connection or pressure handling duct is provided to communicate pressure from the interior of the body, say for instance, from the corner portion thereof, to the interior of the body extension outward of the head on the cylindrical part of the flow control. A suitable control valve is provided to control flow through the duct and is such that flow from the body can be admitted to the body extension to act on the head and thus move the flow control to the closed position or to a position where flow from the body is cut off and fluid is exhausted from the body extension outward of the head.

During normal operation the flow control is retracted from the chamber of the body and flow is through the choke and is controlled thereby. When it is desired to stop flow completely the valve in the fluid handling duct is operated so that the flow control element is actuated to a position to engage the seat on the insert provided in the outlet section of the body. When the device is thus closed or flow is thus shut off the plug in the cap of the extension can be removed and a suitable implement or tool, such, for example, as a bolt, can be inserted to engage the head of the carrier so that the carrier is removed from the insert carrying with it the choke. The structure can be re-established in service without the carrier in place or if a new or different choke is desired, or after repair or reconditioning of the initial choke the carrier can be re-inserted to be supported in the insert, following which the tool employed can be removed and the plug re-inserted in the cap of the extension.

Figure 2:
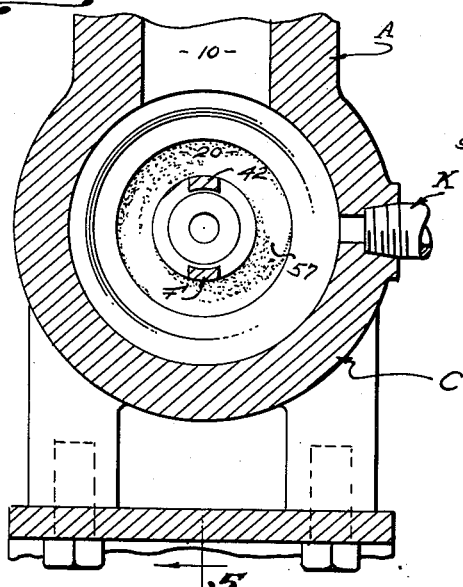
Figure 3:
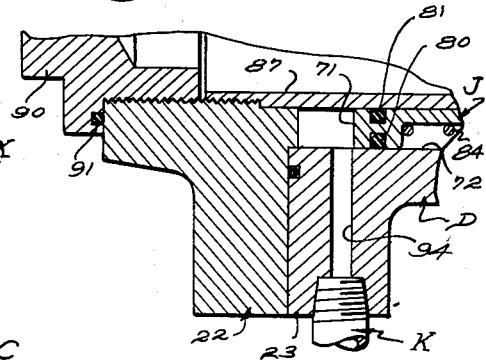
Figure 4:
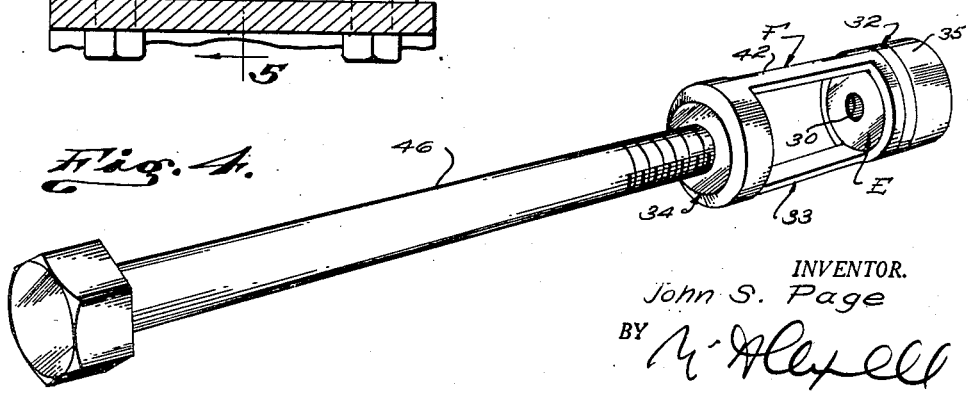
Figure 5:
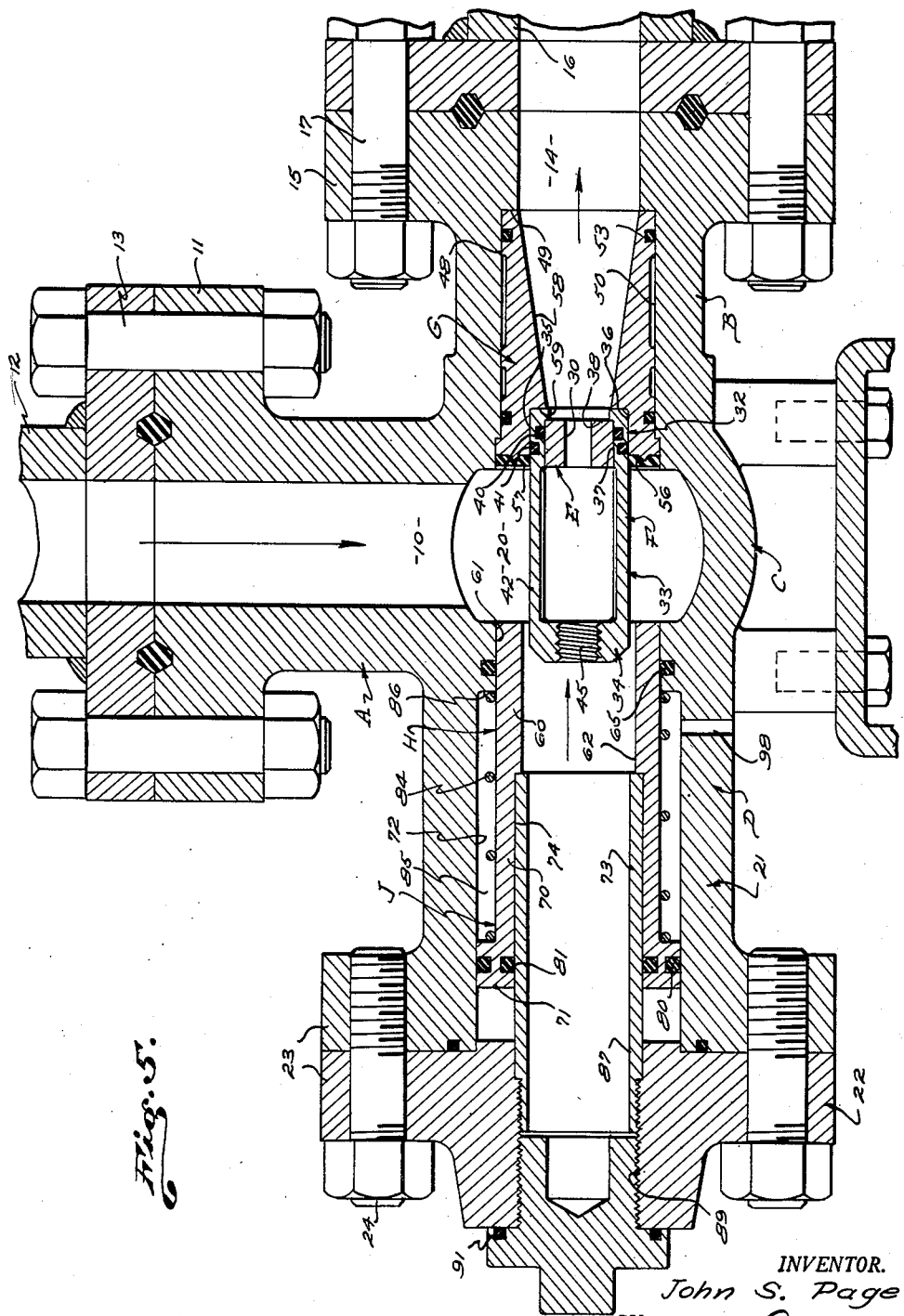

The various objects and features of my invention will be fully understood from the following detailed description of a typical preferred form and application of the invention, throughout which description reference is made to the accompanying drawings, in which:

Fig. 1 is a side elevation of a structure embodying the present invention. Fig. 2 is an enlarged detailed sectional view of a portion of the structure, being a view taken as indicated by line 2—2 on Fig. 1. Fig. 3 is an enlarged detailed sectional view of a portion of the structure, being a view taken as indicated by line 3—3 on Fig. 1. Fig. 4 is a perspective view of the choke carrier showing it supporting the choke and apart from the other portions of the structure, and showing it engaged with or carried by a suitable implement such as a bolt, and Fig. 5 is a detailed longitudinal sectional view of the structure, being a view taken as indicated by line 5—5 of Fig. 2.

The structure provided by the present invention involves, generally, a body having an inlet section A, an outlet section B, a corner portion C and a lateral extension D. A choke or flow bean E is supported in a carrier F mounted in the outlet section B of the body by means of an insert G provided in the body section B. A flow control element H is carried by the body where the extension D joins the corner portion C and is operable into and out of engagement with the insert G. A suitable operating means J is provided for actuating the flow control H and a control K is provided for the means J.

In accordance with the broader principles of the present invention the body of the structure may vary widely in form, construction and arrangement. However, it is preferred that it involve the elements hereinabove mentioned and that these elements be arranged or related as clearly shown in Figs. 1 and 5 of the drawings. The inlet section A of the body is shown as a simple tubular element with a flow passage 10 extending therethrough and provided at its outer end with coupling means 11 for making connection with a supply line 12 or the like. In the case illustrated the means 11 is shown in the form of a flange for carrying suitable bolts 13 provided for establishing a bolted connection between the line 12 and the body.

The outlet section B of the body has a flow passage 14 extending through it and it is provided at its outer end with coupling means 15 for making connection with a suitable outlet line 16. The means 15, like the means 11, is shown as involving a flange carrying suitable fasteners or bolts 17.

The corner portion C of the body is integrally joined to or connects the sections A and B and establishes a corner chamber 20 which connects or joins the passages 10 and 14. In the particular case illustrated the corner portion C connects the sections A and B so that they are at right angles to each other, as clearly shown in Figs. 1 and 5 of the drawings.

The lateral extension D of the body is joined to and projects from the corner portion C where it connects the sections A and B and it is preferably an elongate tubular element located diametrically opposite and in line with the outlet section B of the body. In the preferred form of the invention the extension D involves an elongate tubular part 21 which is joined to and which projects from the central portion C of the body and a cap 22 which closes the outer end of portion 21. In the case illustrated in the drawing the cap 22 is shown releasably secured on portion 21 through a suitable flange connection involving flanges 23 and screw fasteners 24.

The choke or flow bean E may, in practice, vary widely in form or construction and as shown in the drawings it may be in the form of a simple, flat, disc round in cross-section and provided with a central flow passage or aperture 30. The size of the aperture is important or critical as it determines the amount of fluid to be passed by the structure. By forming the flow bean as a simple, round, disc it is simple and inexpensive of manufacture and can be advantageously made of a hard wear-resisting material suitable for service under severe operating conditions.

The carrier F for the flow bean E serves as an element by which the flow bean is mounted in the insert G. In the preferred form of the invention the carrier F involves, generally, a base 32, a cage portion 33 and a head 34 carried by the cage. The base 32 of the carrier F is preferably provided with a straight, round exterior 35 of such size as to slidably fit into a bore 36 entering the insert G from its inner end or from the chamber 20. The base has an opening 37 concentric with the exterior 35 and of such size as to slidably receive the flow bean. The flow bean enters the opening 37 from the cage portion of the carrier and is stopped or seats against a shoulder 38 provided at the inner end of the opening 37. In accordance with the preferred form of the invention a suitable sealing ring 40 seals between the flow bean and the wall of opening 37 and a like sealing ring 41 seals between the exterior 35 of the base 32 and the wall of opening 36.

The cage portion 33 of the carrier F is shown as involving a plurality of spaced legs 42 projecting from the base 32 to normally extend through or across the chamber 20. The legs are limited in number and are so spaced that they do not in any way interfere with adequate flow of fluid from the intake section of the body to the flow bean which is within the carrier.

The head 34 is fixed to or carried by the legs 42 and in practice it may be finished or formed to receive a suitable tool or implement that may be employed for handling the carrier. In the particular case illustrated the head 34 is shown as provided with a central threaded opening 45 in which case the carrier can be advantageously handled or manipulated by means of an ordinary simple bolt or threaded device 46. In Fig. 4 of the drawings I show the carrier apart from the other portions of the mechanism and applied to the end of bolt 46. From this illustration it will be apparent how the carrier can be advantageously either applied to or removed from the insert through the extension D of the body. It is to be understood that when a device or an implement such as a bolt 46 is threaded to the carrier F the threaded engagement is made loose or free so that the parts can be readily engaged and disengaged.

The insert G is, in effect, a liner inserted in or applied to the inner end portion 50 of the passage 14 provided in the outlet section B of the body. The portion 50 of the passage is, in effect, a counterbore entering the outlet section B from the chamber 20 and the insert G has a round or turned exterior 48 and slidably fits into the counterbore 50 to seat against a shoulder 49 formed in the body where the counterbore 50 terminates. Suitable sealing devices 53 are provided between the exterior of the insert G and the wall of bore 50 to provide a fluid tight seal between these parts. From the foregoing description it will be understood how the insert is provided in its inner end or where it faces the chamber 20 with the opening 36 that receives the carrier F. The end 56 of the insert facing the chamber 20 forms an abutment or seat for the flow control H and, as shown in the drawings, it may be provided with a suitable sealing face 57. The portion 58 of the opening through the insert G extending from the shoulder 59 at the inner end of the bore 36 to the end of the insert which engages the shoulder 49 is preferably tapered or flared, as clearly shown in Fig. 5 of the drawings. When the carrier F is in place it is held in position in the bore or opening 36 and seats against the shoulder 59 while the insert G is held in place in the bore 50 and seats against the shoulder 49.

The flow control H involves a tubular element 60 slidably supported in a bore 61 provided in the body where the extension D joins the corner portion C of the body. The bore 60 is concentric with the bore 50 that carries the insert and the tubular part 60 is slidably carried in the bore 61 so that it is shiftable between a retracted position such as is shown in Fig. 5, and an actuated position where it extends through the chamber 20 and engages and seals with the face or seat 57 at the inner end of the insert. The opening 62 through the tubular part 60 is of such size as to freely pass the carrier F with suitable clearance, as is indicated in Fig. 5 of the drawings. In the preferred arrangement the face or seat 57 of packing or sealing material on the inner end 56 of the insert preferably engages and seals with the wall of the opening carrying the insert and also the exterior of the base of the carrier, as will be apparent from Fig. 5 of the drawings. Further, a sealing element 65 is provided between the member 60 and the body where the member 60 is slidably supported in the body.

The operating means provided for operating the flow controlling element 60 is preferably a fluid pressure actuated means and in the drawings it is shown as involving a cylindrical extension 70 of the member or part 60, a head 71 on the cylindrical extension 70 operating in a cylindrical opening or bore 72 provided in extension D, and a tubular core 73 projecting inwardly from the cap 22 and slidably fitting the bore 74 provided in the extension 70. The bore or opening 72 provided in the laterally projecting part 21 of the body is considerably larger than the exterior of the cylindrical extension 70 and the head 71 is in the nature of an enlargement on the end of the extension 70 fitting the bore 72. A suitable sealing means 80 acts between the head and the bore 72 and sealing means 81 acts between the head 71 and the exterior of the core 73. A spring, preferably a helical compression spring 84, is carried in the cavity 85 that occurs between the wall of the bore 72 and the exterior of the cylindrical extension 70. The spring acts between a shoulder 86 and the head 71 to normally yieldingly hold the parts in the retracted position shown in Fig. 5 of the drawings.

The core 73 is a tubular element with a central opening 87 sufficiently large to pass the carrier F. The core 73 is supported by the cap 22 so that it is concentric with the cylindrical extension 70 and it extends into and is slidably engaged in the opening or bore 74 provided in extension 70. In the particular case illustrated the cap 22 is shown provided with a central threaded opening 89 and the core 87 is threaded into the inner portion of that opening. A removable plug 90 is threaded into the outer portion of the opening 89. The plug 90 is shown as having a seal 91 and it is normally in place as shown in Fig. 5 so that the structure is completely sealed or closed. When the plug 90 is removed an implement such as a bolt 46 can be introduced through the opening 89, the core 73 and the flow controlling part 60 to engage the threaded opening 45 in the carrier F. Through this construction it is possible to easily and conveniently insert a carrier F carrying a flow bean or to remove a carrier, as circumstances require.

The control means K for the operating means J involves a duct 92 handling fluid from the body so that it enters the outer end portion of the body projection 21 between the cap 22 and the head 71 to act on the head and force it inwardly. In the particular case illustrated the duct 90 is shown connected into the corner portion C of the body where it receives fluid at the pressure that is on the fluid introduced through the section A. The duct 92 is shown extending at the exterior of the body to the outer end portion of projection 21 where it enters the structure outward of head 71 through a suitable port 94. A suitable control valve 95 is provided in the duct 92 and may be a simple conventional valve having three operating positions one where it stops flow through the duct 92, another where it is open and allows flow through the duct from the central portion of the body to act on the head 71, and another where it stops flow from the central portion of the body and opens the outer end portion of the body extension 21 to a drain opening or outlet 96, relieving pressure so that the spring 84 returns the parts to the position shown in Fig. 5. It will be apparent how pressure from the central portion of the body acting on head 71 will move the head and the parts 70 and 60 joined thereto in the direction indicated by the arrow in Fig. 5, until the flow controlling part 60 seats against the seal 57 at the inner end of the insert G. In practice it is desirable to provide a vent opening 98 from the recess 85 to the exterior of the body so that pressure does not build up or develop in the recess in a manner to interfere with the desired action of the mechanism.

Under normal operating conditions the parts are set or positioned as shown in Fig. 5 of the drawings. The flow controlling member 60 is retracted and fluid introduced or entering through the inlet section A of the body passes through the opening 30 of the flow bean to pass through the flarng portion 58 of the opening in the insert G to finally issue from the outlet section B of the body into the line 16. When it is desired to stop flow through the structure or to repair, remove or replace the flow bean or the cage carrying the flow bean, the valve 95 is operated so that pressure from the central portion of the body is introduced to the outer end portion of the body extension 21 to there act on the head 71 and move the flow control element 60 to operating position. While the pressure is thus maintained on the head 71 the plug 90 may be removed and an implement such as a bolt 46 may then be introduced to engage the carrier F and can be employed to remove the carrier with the flow bean located therein. When the desired repair or replacement has been made the carrier can be re-inserted into operating position and when the bolt or other implement has been removed leaving the carrier in place, the plug 90 can be reinserted in the opening 89. To open the structure for operation the valve 95 is operated to relieve pressure from the head 71, whereupon the spring 84 and fluid pressure returns the part to the position shown in Fig. 5.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A structure of the character described including, a body having a fluid inlet passage and having a fluid handling outlet section, and a portion opposite said section and provided with a removable closure adapted to pass fluid from the inlet passage to the outlet section, a flow bean, means releasably supporting the flow bean in said body section, a flow control normally retracted so there is free flow through the flow bean, and means for operating the flow control to a position stopping flow to the flow bean, the flow bean being removable from the body through said portion of the body when the flow control is operated and the said closure is removed.

2. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means for operating the flow control to a position stopping flow to the flow bean, the flow bean being removable from the body through said portion of the body when the flow control is operated and the said closure is removed, the first mentioned means including, a carrier holding the flow bean and removable from the body and an insert in the outlet section of the body releasably supporting the carrier.

3. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a tubular flow control normally retracted so there is free flow through the flow bean, and means for operating the flow control to a position stopping flow to the flow bean, the flow bean being removable from the body through said portion of the body and the flow control when the flow control is operated and the said closure is removed.

4. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control slidably carried by said portion of the body and normally retracted so there is free flow through the flow bean, and means for operating the flow control to a position stopping flow to the flow bean, the flow bean being removable from the body through said portion of the body when the flow control is operated and the said closure is removed.

5. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and fluid pressure actuated means for operating the flow control to a position stopping flow to the flow bean, the flow bean being removable from the body through said portion of the body when the flow control is operated and the said closure is removed.

6. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means carried by said portion of the body for operating the flow control to a position stopping flow to the flow bean, the flow bean being removable from the body through said portion of the body when the flow control is operated and the said closure is removed.

7. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means for operating the flow control to a position stopping flow to the flow bean including, a cylindrical extension on the flow control with a head operating in said portion of the body and a tubular core carried by the closure and slidably engaged in said extension, the flow bean being removable from the body through said portion of the body when the flow control is operated and the said closure is removed.

8. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means for operating the flow control to a position stopping flow to the flow bean including, a cylindrical extension on the flow control with a head operating in said portion of the body, a spring normally yieldingly holding the extension with the flow control retracted, and a tubular core carried by the closure and slidably engaged in said extension, the flow bean being removable from the body through said portion of the body when the flow control is operated and the said closure is removed.

9. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means for operating the flow control to a position stopping flow to the flow bean, the flow bean being removable from the body through said portion of the body when the flow control is operated and the said closure is removed, the first mentioned means including, a flow bean carrier removable from the body through said portion of the body when the flow control is operated and the said closure is removed and having a base releasably supported from said body section and a tool receiving head.

10. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means for operating the flow control to a position stopping flow to the flow bean, the flow bean being removable from the body through said portion of the body when the flow control is operated and the said closure is removed, the first mentioned means including a flow bean carrier removable from the body through said portion of the body when the flow control is operated and the said closure is removed and having a base releasably supported from said body section, a cage projecting from the base, and a tool receiving head carried by the cage.

11. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means for operating the flow control to a position stopping flow to the flow bean, the flow bean being removable from the body through said portion of the body when the flow control is operated and the said closure is removed, the first mentioned means including a carrier holding the flow bean and removable from the body, and an insert in the outlet section of the body releasably supporting the carrier and removable from the body only through the said portion thereof.

12. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, means for operating the flow control to a position stopping flow to the flow bean including, a cylindrical extension on the flow control with a head operating in said portion of the body and a tubular core carried by the closure and slidably engaged in said extension, and means supplying operating fluid from the body to said head.

13. A structure of the character described including, a body having tubular inlet and outlet sections joined at right angles by a corner portion and having a lateral projection on said portion opposite the outlet section and provided with a removable closure, a choke, means releasably supporting the choke in the outlet section, a tubular flow control carried by the said projection and normally retracted from the corner portion, and means for operating the flow control to a position in the corner portion where it stops flow to choke, the choke being removable from the body through the projection when the flow control is operated and the closure is removed.

14. A structure of the character described including, a body having tubular inlet and outlet sections joined at right angles by a corner portion and having a lateral projection on said portion opposite the outlet section and provided with a removable closure, a choke, a carrier supporting the choke, means releasably supporting the choke carrier in the outlet section, a tubular flow control carried by the said projection and normally retracted from the corner portion, and means for operating the flow control to a position in the corner portion where it stops flow to the choke, the choke carrier being removable from the body through the projection when the flow control is operated and the closure is removed.

15. A structure of the character described including, a body having tubular inlet and outlet sections joined at right angles by a corner portion and having a lateral projection on said portion opposite the outlet section and provided with a removable closure, a choke, a carrier supporting the choke, means releasably supporting the choke carrier in the outlet section including a tubular insert engaged in the outlet section from the corner portion and through the projection, a tubular flow control carried by the said projection and normally retracted from the corner portion, and means for operating the flow control to a position in the corner portion where it stops flow to the choke, the choke carrier being removable from the body through the projection when the flow control is operated and the closure is removed.

16. A structure of the character described including, a body having tubular inlet and outlet sections joined at right angles by a corner portion and having a lateral projection on said portion opposite the outlet section and provided with a removable closure, a choke, means releasably supporting the choke in the outlet section, a tubular flow control carried by the said projection and normally retracted from the corner portion, and means within the projection for operating the flow control to a position in the corner portion where it stops flow to the choke, the choke being removable from the body through the projection when the flow control is operated and the closure is removed.

17. A structure of the character described including, a body having tubular inlet and outlet sections joined at right angles by a corner portion and having a lateral projection on said portion opposite the outlet section and provided with a removable closure, a choke, means releasably supporting the choke in the outlet section, a tubular flow control carried by the said projection and normally retracted from the corner portion, and means within the projection for operating the flow control to a position in the corner portion where it stops flow to the choke including, a cylindrical extension on the flow control, a head on the cylindrical extension and slidably engaged in the projection, and a tubular core carried by the closure and slidably engaged in the cylindrical extension, the choke being removable from the body through the projection when the flow control is operated and the closure is removed.

18. A structure of the character described including, a body having tubular inlet and outlet sections joined at right angles by a corner portion and having a lateral projection on said portion opposite the outlet section and provided with a removable closure, a choke, means releasably supporting the choke in the outlet section, a tubular flow control carried by the said projection and normally retracted from the corner portion, and means within the projection for operating the flow control to a position in the corner portion where it stops flow to the choke including, a cylindrical extension on the flow control, a head on the cylindrical extension and slidably engaged in the projection, a spring surrounding the extension and located within the projection and bearing on said head, and a tubular core carried by the closure and slidably engaged in the cylindrical extension, the choke being removable from the body through the projection when the flow control is operated and the closure is removed.

19. A structure of the character described including, a body having a fluid inlet passage and having a fluid handling outlet section, and a portion opposite said section and provided with a removable closure, a flow bean adapted to pass fluid from the inlet passage to the outlet section, means releasably supporting the flow bean in said body section, a flow control normally retracted so there is free flow through the flow bean, and means for operating the flow control to a position stopping flow to the flow bean, the flow bean being removable from the body through said portion of the body when the flow control is operated and the said closure is removed, the first mentioned means including a carrier holding the flow bean and removably mounted in the outlet section of the body.

JOHN S. PAGE.

REFERENCES CITED

The following references are of record in the file of this patent:

UNITED STATES PATENTS

| Number | Name | Date |
|---|---|---|
| 1,971,159 | Laurent | Aug. 21, 1934 |
| 2,124,359 | Weisgerber | July 19, 1938 |
| 2,236,873 | Hamer | Apr. 1, 1941 |